Dec. 8, 1970   R. E. GILLASPIE ET AL   3,545,189
SAFETY BLADE FOR ROTARY LAWNMOWERS
Filed Nov. 1, 1968
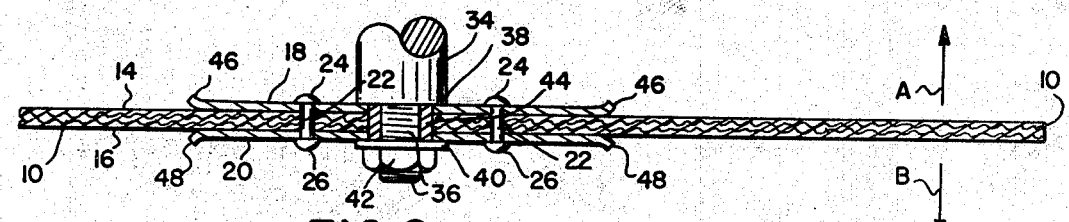
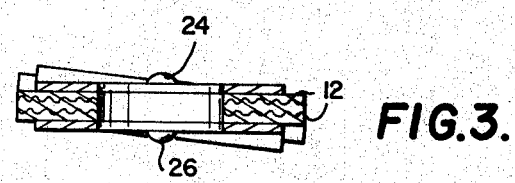
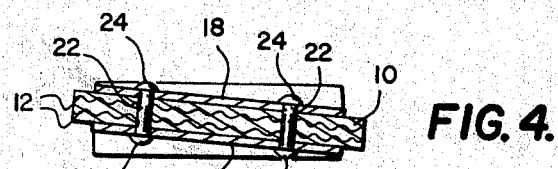
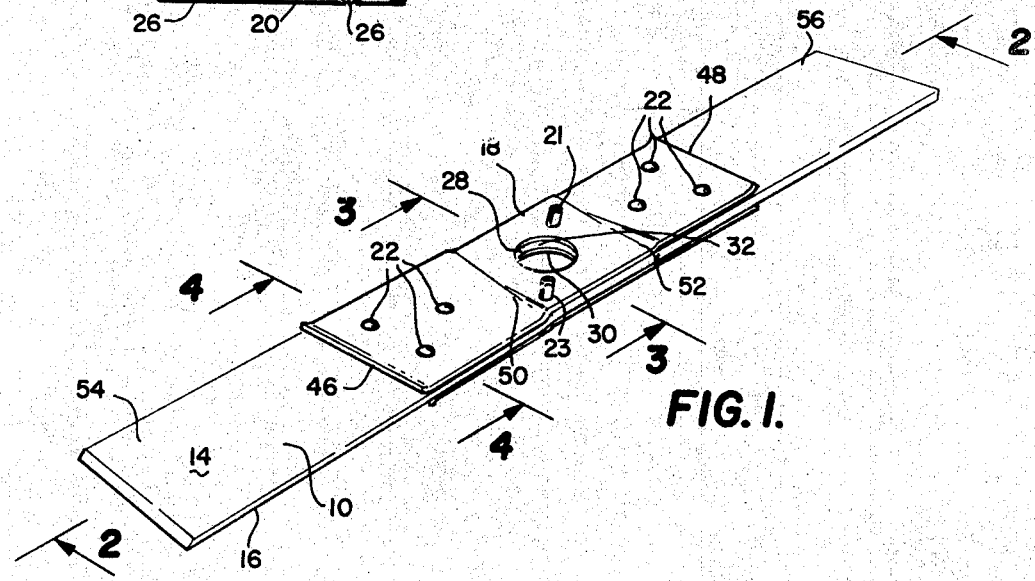
INVENTOR.
ROBERT E. GILLASPIE
ELMER R. HOULE
BY
Wm. H. Dean United States Patent Office 3,545,189
Patented Dec. 8, 1970

3,545,189
SAFETY BLADE FOR ROTARY LAWNMOWERS
Robert E. Gillaspie and Elmer R. Houle, Phoenix, Ariz., assignors to Safeco Products, Inc., Tempe, Ariz., a corporation of Arizona
Filed Nov. 1, 1968, Ser. No. 772,577
Int. Cl. A01d 55/18
U.S. Cl. 56—295                                6 Claims

ABSTRACT OF THE DISCLOSURE

A safety blade for rotary lawnmowers comprising a strap-like blade of rubber-like material having relatively rigid clamp plates riveted or otherwise secured to opposite sides of the blade; the clamp plates being helically twisted in spaced relation from said openings in order to hold opposite ends of said rubber-like blade in helically disposed position; opposite ends of said plates being disposed in outwardly diverging relation with opposite sides of said blade to prevent galling of said blade when it flexes from side to side in upward and downward directions.

BACKGROUND OF THE INVENTION

Various safety blades for rotary lawnmowers have employed a great variety of structures, however, many of them are somewhat complicated and expensive to produce, and, consequently, are relatively expensive to replace. Flexible rotary mower blades require a relatively rigid means for holding the blades in connection with the shaft of a rotary lawnmower engine, and also to maintain proper disposition of such blades. Most prior art elastic blades have lacked the ability to attain helical operation of the blade sections sufficient to elevate cut grass so that the cut grass may be collected in the conventional manner through expulsion of the cut grass vertically and radially outward into a collecting basket or bag. Additionally, upward and downward flexing of prior art elastic lawnmower blades tends to cause galling of the blade adjacent relatively rigid elements which hold the blade in connection with the lawnmower engine shaft.

SUMMARY OF THE INVENTION

The present invention comprises a very simple and economical safety blade for rotary lawnmowers, wherein a pair of plates are clamped to opposite sides of an elongated strap-like blade member made of rubber-like material with fabric reinforcing layers therein. The clamp plates are fixed to opposite sides of the rubber-like blade by means of rivets or other fixtures, such as bolts, and twisted portions in the plates hold opposite ends of the rubber-like blade in a helical disposition relative to the rotating axis of the blade assembly which is provided by openings through the clamp plates and blade generally disposed on a normally vertical axis. Opposite ends of the clamp plates are flared or diverge away from opposite sides of the rubber-like blade so that during normal operation and side to side, up and down deflection of the rubber-like blade, it does not tend to become galled on the edges at opposite ends of the clamp plates, thus insuring against damage to the flexible or rubber-like blade at its immediate connection or engagement with the clamp plates at opposite sides thereof.

Accordingly, it is an object of the present invention to provide a very simple and economical safety blade for rotary lawnmowers having helical grass lifting capabilities, as well as very simple means in the form of oppositely diverging portions at opposite edges of the clamp plates to prevent galling of the blade when it moves in a up and down, side to side relation as it cuts grass and deflects from other objects.

Another object of the invention is to provide a safety blade for rotary lawnmowers wherein a rubber-like blade provides for safety of operation in that the rubber-like blade does not tend forcefully to impel hard objects, such as rocks or other elements, and wherein the rubber-like blade is supported in connection with a rotary lawnmower engine shaft in such a manner that it operates in the helical fashion and such that galling of the blade adjacent its connection with relatively rigid structure is alleviated to ensure long life of the blade at its connection with the clamping plates which are secured to the shaft of the lawnmower engine.

Further objects and advantages of the invention may be apparent from the following specification, appended claims and accompanying drawings.

BRIEF DESCRIPTION OF THE DRAWINGS

FIG. 1 is a perspective view of a safety blade for rotary lawnmowers in accordance with the present invention;

FIG. 2 is a fragmentary sectional view of the safety blade of the invention shown in connection with a fragmentary portion of a lawnmower engine blade-supporting shaft;

FIG. 3 is a transverse sectional view taken from the line 3—3 of FIG. 1; and

FIG. 4 is another transverse sectional view taken from the line 4—4 of FIG. 1.

DESCRIPTION OF THE PREFERRED EMBODIMENTS

As shown in FIG. 1 of the drawings, the safety blade for rotary lawnmowers, in accordance with the present invention, comprises an elongated strap-like member 10 which is of rubber-like material, and, as shown in FIGS. 3 and 4, has reinforcing fabric layers 12 therein. These fabric layers may be produced of steel mesh or elastomeric material, such as nylon, or the like, in order to attain longitudinal tensible strength of the blade 10, while also permitting great flexibility of the blade so that it may readily deflect when it contacts a solid object to thereby alleviate the tendency of the blade to drive solid objects at high velocity from a position beneath the mower and radially outward therefrom or tangentially therefrom, thus the elastic rubber-like character of the blade 10 effectively reduces the hazard of a rotary lawnmower with respect to its tendency to throw solid objects, such as stones, or the like.

Secured to normally upper and lower sides 14 and 16 of the blade 10 are clamp plates 18 and 20. These clamp plates 18 and 20 are fixed together in clamped relationship with said opposite sides 14 and 16 by means of rivets 22 which extend through the plates and through the blade 10. These rivets 22 are provided with heads 24 abutted to the plate 18 and heads 26 abutted to the plate 20 so that the plates 18 and 20 are clamped securely and compressively against opposite sides 14 and 16 of the blade 10.

The plates 18 and 20 are provided with respective central openings 28 and 30, which are aligned with a central opening 32 in the blade 10; all of these openings are disposed on a normally vertical axis when the safety blade of the invention is used in connection with the shaft 34 of a conventional rotary lawnmower engine, all as shown best in FIGS. 1 and 2 of the drawings. Openings 21 and 23 in the plates 18 and 20 are adapted to receive conventional driving dowels carried by most rotary lawnmower drive shafts.

The shaft 34 of a conventional engine is generally provided with a reduced externally threaded portion 36 having a shoulder 38 of the shaft 34 available to form an abutment for the clamp plate 18, while a washer 40 engages the clamp plate 20 and a nut 42 forcefully clamps the washer 40 in opposition to the shoulder 38, while a cylindrical bushing 44 surrounds the threaded portion 36 of the shaft and holds it concentrically aligned in the openings 28, 30 and 32.

These openings 28, 30 and 32 are normally larger than the average threaded section 36 of the average lawnmower engine shaft 34 in order to provide convenience in the fitting of the safety blade of the invention to various lawnmower engine shafts.

The clamp plates 18 and 20 at their opposite ends are provided wtih flared portions 46 and 48, respectively, as shown best in FIG. 2 of the drawings. Thus, respective opposite ends 46 and 48 of the clamp plates 18 and 20 diverge away from each other at opposite sides 14 and 16 of the blade 10 so that upward and downward flexing in side to side directions, as indicated by arrows A and B in FIG. 2 of the drawings, will not cause galling of opposite upper and lower sides 14 and 16 of the blade 10 against the ends of the clamping plates 18 and 20. The diverging portions 46 and 48 thus permit upward and downward side to side flexing of the blade 10 without causing contact thereof with the sharp or relatively thin edges at the opposite ends of the clamp plates 18 and 20. Thus, the invention promotes the fabrication of a very simple and extremely economical lawnmower safety blade which is very durable at its connection with the relatively rigid elements constituted by the clamp plates 18 and 20 which hold the blade in connection with the shaft of the rotary lawnmower engine.

The plates 18 and 20 are twisted at 50 and 52, such that opposite ends 54 and 56 of the blade 10 are held in helical disposition relative to the vertical axis of the openings 28, 30 and 32, this helical disposition being such that with the direction of rotation of the shaft 34 of the lawnmower engine that the blade 10 will provide aerodynamic or physical lift of cut grass from the surface of a lawn so that the grass may be blown upward into the lawmower housing and readily or tangentially outward through the usual exhaust duct and into a collector, such as a bag or a basket.

It will be obvious to those skilled in the art that the headed rivets 22 are the equivalent of bolts which may have heads abutted to the outer sides of the clamp plates 18 and 20, and that the clamp plates 18 and 20 may be of any material which is substantially rigid relative to the rubber-like blade 10; the material used for the plates 18 and 20 is preferably a tough thin material which is corrosion resistant; such material may be stainless steel, or other material, as desired.

The rubber-like material of the blades 10 may be various polymers, such as polyurethane, or any other material having high abrasion resistance, and as hereinbefore described, the fabric layers 12 may be of flexible steel, nylon, or any other flexible fabric having substantially high tensile strength to resist the radial stresses imposed in the rubber-like blade 10 when it is rotated at high speed about the vertical axis of the openings 28, 30 and 32, and also to prevent rupture of the rubber-like material of the blade 10 when the blade strikes a solid object and is deflected thereover.

It will be obvious to those skilled in the art that various modifications of the present invention may be resorted to without departing from the spirit of the present invention.

We claim:
1. In a safety blade for rotary lawnmowers, the combination of: an elongated strap-like elastic blade of rubber-like material; reinforcing fabric layers bonded in said blade; a pair of opposed clamp plates engaged with opposite sides of said strap-like blade; rivets extending through both of said clamp plates and said blades; said rivets headed at the outer surfaces of said plates; said plates and said blade having normally vertical axially aligned central openings extending therethrough and adapted to receive the shaft on a rotary mower engine; said plates being of relatively stiff metal and each having a helically twisted portion spaced from said central openings for holding opposite ends of said blades in helically angular relation to the axes of said openings and the plane of said plates at said central openings.

2. The invention as defined in claim 1 wherein said plates are provided with opposite outer ends diverging away from opposite sides of said blade to prevent galling of said blade by said ends of said plate as said blade flexes from side to side in an upward and downward direction.

3. In a safety blade for rotary lawnmowers, the combination of: an elongated strap-like elastic blade of rubber-like material; reinforcing fabric layers bonded in said blade; a pair of opposed clamp plates engaged with opposite sides of said strap-like blade; fixture elements extending through both of said clamp plates and said blade; said fixture elements abutted at the outer surfaces of said plates; said plates and said blade having normally vertical axially aligned central openings extending therethrough adapted to receive the shaft of a rotary lawnmower engine; said blades being of relatively stiff material and each having a helically twisted portion spaced from said central openings for holding opposite ends of said place in helically angular relation to the axis of said openings and the planes of said plates at said central openings.

4. The invention as defined in claim 3 wherein opposite outer ends of said plates are disposed in diverging relation from opposite sides of said blade to prevent galling of said blade by said ends of said plates as said blade flexes from side to side in an upward and downward direction, the helically angular disposition of said opposite ends of said blade tending to elevate cut grass when said safety blade is rotated about the normally vertical axis of said openings.

5. The invention as defined in claim 4 wherein a bushing is disposed in said opening and adapted to concentrically hold a shaft portion of a rotary lawnmower engine concentrically in said openings when the shaft of the engine is smaller than said openings.

6. The invention as defined in claim 3 wherein said blade is provided with opposed cutting edges which are generally disposed at right angles to opposite sides thereof.

References Cited

UNITED STATES PATENTS

| | | | |
|---|---|---|---|
| 3,133,398 | 5/1964 | Tatum | 56—295X |
| 3,302,377 | 2/1967 | Ely | 56—295 |
| 3,343,340 | 9/1967 | Freedlander et al. | 56—295 |

ANTONIO F. GUIDA, Primary Examiner